Oct. 31, 1939.    J. S. KIMBLE ET AL    2,177,658
METHOD FOR FEEDING THERMOPLASTIC MATERIALS
Filed Feb. 25, 1937

John S. Kimble &
Ernest C. Blackard,
INVENTORS.
N. M. Perrins
Daniel J. Mayne
BY
ATTORNEYS.

Patented Oct. 31, 1939

2,177,658

UNITED STATES PATENT OFFICE 2,177,658

METHOD FOR FEEDING THERMOPLASTIC MATERIALS

John S. Kimble and Ernest C. Blackard, Kingsport, Tenn., assignors to Eastman Kodak Company, Rochester, N. Y., a corporation of New Jersey Application February 25, 1937, Serial No. 127,661

1 Claim. (Cl. 18—55)

This invention relates to processes for the manufacture of thin tubing or sheeting from thermoplastic materials and more particularly to the manufacture of relatively thin transparent sheeting from thermoplastic cellulose organic derivative molding compounds such as cellulose acetate, cellulose acetate propionate, ethyl and benzyl ethers, and other organic derivatives of cellulose as well as other suitable thermoplastic organic compounds.

Processes and apparatus for the manufacture of thin sheets and the use of such thin sheets is quite well known in the art. Such sheeting material is to a large extent produced and used for wrapping materials. In that instance the properties of such material need not be especially exacting. However, in certain industrial uses such as, for example, in the manufacture of laminated glass, the exact specifications of sheeting material becomes of considerable importance. While sheets produced by conventional methods may appear to the eye to be substantially uniform, in many instances it can be found by careful measurements that the sheets are of more or less non-uniform characteristics. That is, for example, conventionally produced sheeting may exhibit different strengths; and may vary considerably in density or two similarly appearing sections of sheeting made at different times may have the same physical appearance but when made up into laminated glass will exhibit markedly different characteristics, owing to variations in the process of manufacture.

We have found that one of the causes of such variations is in uneven and non-uniform feeding of the plastic compositions, from which the sheet is made, through the extrusion die. The result of such feeding is that the apparent density of the material will increase or decrease as the pressure and rate of feeding varies, and in some cases the thickness of the sheet will vary over comparatively wide limits when made into laminated glass. Such sheets will cause considerable manufacturing problems and may also produce undesirable optical effects.

An object of the invention is a method for producing a thermoplastic, transparent, substantially uniform sheet.

Another object of the invention is an improved method for continuously forcing a thermoplastic material thru an extrusion die, to insure the production of a sheet having substantially uniform density and dimensions. Other objects will appear hereinafter.

In accordance with the present invention these and other objects are attained by uniformly feeding a suitable thermoplastic material to a suitable extrusion die by forcing regulated amounts of the composition from the pressure chamber of a power injection press to a series of interconnected conveyors which conduct the composition into the die chamber at a constant rate. In one embodiment of the invention the composition in passing through the first conveyor may be cooled to prevent interference with the operation of the injection press and may be heated when passing through the remaining conveyor or conveyors to the die.

The invention will be more clearly understood from the following detailed description with reference to the attached drawing in which.

In the drawing like elements are designated with the same numeral for convenience in description.

Figure 1:
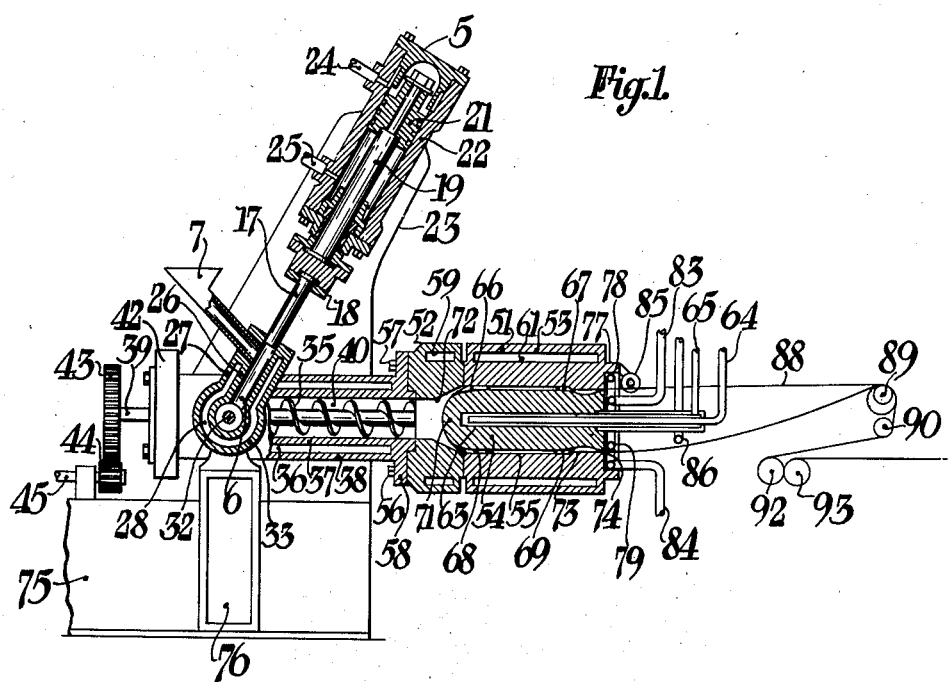
Fig. 1 is a diagrammatic view in elevation of our improved pressure feeding apparatus for the production of thermoplastic sheeting, associated with a suitable extrusion die.

Referring to Fig. 1 there is shown an extrusion apparatus for the continuous production of thermoplastic sheeting comprising a hydraulic injection press 5, a pair of coacting screw conveyors 31 and 35 and an extrusion die assembly 51.

A predetermined amount of a suitable thermoplastic composition preferably of the non-solvent containing type described in the copending Blackard and Waterman application Serial No. 127,660, entitled "Method of plasticizing thermoplastic materials," filed of even date, may be employed in the present process.

The preferred composition is made by mixing in a suitable mixing apparatus, for example, a jacketed sigma blade mixer, a mixture of a cellulose organic derivative with a solvent plasticizer at normal temperatures, continuing the mixing until it becomes substantially homogeneous, and while still continuing the agitation, raising the temperature of the mixer, and continuing mixing at the raised temperature until the cellulose derivative and plasticizer become further homogenized; this mixing at raised temperature causes the plasticizer to permeate the cellulose derivative particles more thoroughly. The mixer is then cooled to normal temperature while mild agitation is continued, such as by intermittently agitating. The composition is then removed from the mixer and permitted to season at room temperature to further enhance penetration by the plasticizer and complete homogenization. As an alternative seasoning step, the mixture need not be cooled to room temperature, removed from the mixer, and stored for seasoning. Instead, the temperature may be lowered to some point intermediate to atmospheric temperature and the temperature to which the mixture was raised, and mild agitation continued for a period of about 24 hours, after which the temperature may be lowered to that of the room. The material is then ready for use without any further seasoning, and may be removed from the mixer and fed to the desired machine. If desired, the initial mechanical mixing may be conducted at a temperature somewhat below the normal room temperature so as to further assure that the active plasticizer and cellulose derivative will be thoroughly mixed without local combination.

Typical examples of the preferred methods of mixing and of suitable compositions are the following:

*Example I.*—100 parts by weight of cellulose acetate having a relatively small particle size, such as approximately 40 mesh or finer, are placed in a jacketed sigma blade mixer together with 80 parts of dimethyl phthalate. Both the plasticizer and cellulose ester should be at or slightly less than room temperature. The temperature of the mixture should be maintained at about 25° C. during the preliminary mixing by circulating suitable amounts of cooling fluid through the water jacket of the device.

The mixture of cellulose acetate and plasticizer is then subjected to mechanical mixing for a period of approximately one hour by revolution of the blades of the mixing device which cut through the mass and continuously turn it over and expose new surfaces for contact with the plasticizer. The mixture, while the agitation continues is then heated by passing heating fluid through the jacket for a period of one hour at an elevated temperature, such as 50–70° C.

This enhances the penetration of the plasticizer into the acetate and a substantially homogenized composition is thus formed. The composition is then cooled by flowing cold water through the jacket and the agitation is continued until the temperature of the mass is brought down to about room temperature. Preferably the mass is cooled with mild or intermittent agitation.

The composition is then removed from the mixer and is stored in suitable containers at a temperature of about 25° C. for 24 hours before use. This permits the material to thoroughly season, i. e. permits further penetration of the plasticizer into the acetate particles so that the mixture is completely homogenized. The plasticized mass, which is in the form of a powder, damp with plasticizer, in which the particles are, nevertheless, not appreciably agglomerated, may be employed in molding and extrusion operations wherein the solvent nature of the plasticizer is important to obtain a clear sheet.

*Example II.*—100 parts by weight of cellulose acetate propionate having a particle size corresponding to about 40 mesh are mixed as in Example I with 80 parts of dimethyl phthalate. The initial temperature of the plasticizer and cellulose acetate propionate may be about 20° C. and the preliminary mixing may be carried out as heretofore described while the mixer is maintained slightly below room temperature. The heating operation is conducted at a temperature of about 40° C. for two hours while the mass is agitated whereupon the mixer is cooled as above described and the mixture seasoned for about 24 hours.

*Example III.*—100 parts of cellulose acetate propionate having a particle size corresponding to about 40 mesh are placed together with 80 parts by weight of a mixture of 80% dimethyl phthalate and 20% diethyl phthalate in the sigma blade mixer and mixed for an hour at a temperature of about 25° C. The temperature of the mixer is then raised to about 60° C. and the agitation is continued for about 1 hour after which the mixer is cooled as above described. The composition is then permitted to season for 24 hours.

In general the heating limits of the mass during mixing are between 30 to 90° C. for a period varying between ½ to 2 hours. It is preferable that the ingredients before mixing are not above room temperature and if the temperature tends to rise during the preliminary mechanical mixing, the mixer may be kept at a temperature below normal to compensate for such a rise.

As hereinbefore pointed out, the seasoning treatment may alternatively be conducted at a temperature intermediate the highest mixing temperature and atmospheric temperature, preferably with mild agitation such as slow or only occasional stirring. Thus, if the elevated temperature mixing is conducted at 60° C., the seasoning may be carried on for 24 hours at 40° to 45° C. by giving the blades of the mixer an occasional rotation. Thus it is not necessary to remove the material and store in separate vessels for seasoning.

While a satisfactorily plasticized cellulose derivative plastic can be made by mixing the active plasticizers at approximately room temperatures and subsequently heat treating and seasoning the mass, the plasticizer and cellulose derivative may be mixed at temperatures several degrees below room temperature to further assure the noncombination of the plasticizer and cellulose derivative during the initial mechanical mixing. When the initial mixing is conducted within the approximate temperature range of 0° C. to 30° C., a satisfactory mixture will be obtained, if the mixture is then treated in accordance with the subsequent steps of the process described above. Obviously lower initial mixing temperatures may be employed so long as one does not go below the solidification point of the plasticizer.

While in the above examples, the invention is illustrated by reference to the plasticizing of cellulose acetate, cellulose acetate propionate, cellulose butyrate, ethyl cellulose and benzyl cellulose, the process is also applicable to the plasticizing of other cellulose organic derivatives. It is applicable to either the fully esterified or hydrolyzed esters, but particularly to the hydrolyzed esters as these are particularly adapted for molding compositions due to their inherently greater plasticity than the unhydrolyzed esters. It has been found that the most satisfactory results can be obtained with the above procedure when the cellulose derivative is in the form of small hard dense particles rather than in the form of loose, porous, or fluffy particles.

Likewise while the process is illustrated by reference to the use of certain specific plasticizers the invention includes the use of any of the plasticizers which have a mild solvent action upon the cellulose organic derivative. Such plasticizers include dimethyl phthalate, diethyl phthalate, benzyl lactate, triacetin, ethylene glycol diacetate, diethylene glycol diacetate, triethylene glycol diacetate, ethylene glycol dipropionate, glyceryl chloro dipropionate or suitable mixtures thereof, and others.

To avoid confusion in terminology, it can be stated that by a solvent plasticizer is meant one which, when used in relatively large quantities with respect to the cellulose derivative, as for instance 10 parts of plasticizer to 1 part of cellulose derivative, will dissolve the cellulose derivative at room temperatures. It is important to employ a solvent plasticizer where such things as optically clear products are desired to be obtained by hot extrusion, molding, and the like.

It is also to be noted that any proportions of plasticizer which do not form a solution of the cellulose derivative during the mixing or seasoning. For instance, with most solvent plasticizers we may employ from about 20 to about 175 parts of plasticizer to 100 parts of cellulose derivative.

In the above examples the particle size of the cellulose derivative is 40 mesh, however, it will be understood that various sized particles may be employed roughly in a range of from 40 to 300 mesh and in most cases within a range of from 40 to 200 mesh.

It will be evident from the above description that we are employing a non-volatile solvent containing composition and this greatly aids in producing a sheet of the required uniform characteristics.

The selected composition is conducted into the pressure chamber 6 of the hydraulic press 5 through the passageway 7.

The hydraulic press 5 comprises a plunger 17 mounted upon and moved by a cross head 18 which in turn is recopricated by a piston rod 19 and piston 21 reciprocable in hydraulic cylinder 22 which is mounted on the supporting member 23. The cylinder 22 is supplied with air under pressure through pipes 24 and 25, the flow of air being regulated by appropriate valve mechanisms, not shown, designed to exhaust or open one of the pipes when supplying the other pipe with high pressure air. By movement of the valve in one direction the plunger 17 may be forced into the chamber 6, and the movement of the valve in the opposite direction will cause retraction of the plunger from the chamber. The chamber 6 has double walls 26 and 27 which form a jacket 28 through which cooling liquids may be passed to prevent melting of the mixture in the vicinity of the plunger 17. When the chamber 6 is filled with the thermoplastic composition, the press 5 is actuated and the composition is forced by plunger 17 into a jacketed chamber 29. This chamber 29 shown in detail in Fig. 2 contains a close fitting conveyor screw 31 whose shaft 32 is also shown in Fig. 1 and has a cooling jacket 33 formed by double walls 30 and 34 through which water or other cooling fluid may be passed. Cooling jackets 28 and 33 are interconnected and the cooling fluid may be conducted thereto and removed therefrom by suitable inlets and outlets not shown in the drawing. If desired the conveyor screw 31 may be internally cooled by employing a screw having a hollow interior with suitable means for conveying cooling fluid to and from the interior. The screw 31 may be rotated by any suitable motive means attached to its shaft 32 which is suitably journaled in a stuffing box, the head of which is shown at 41 in Fig. 2.

Figure 2:
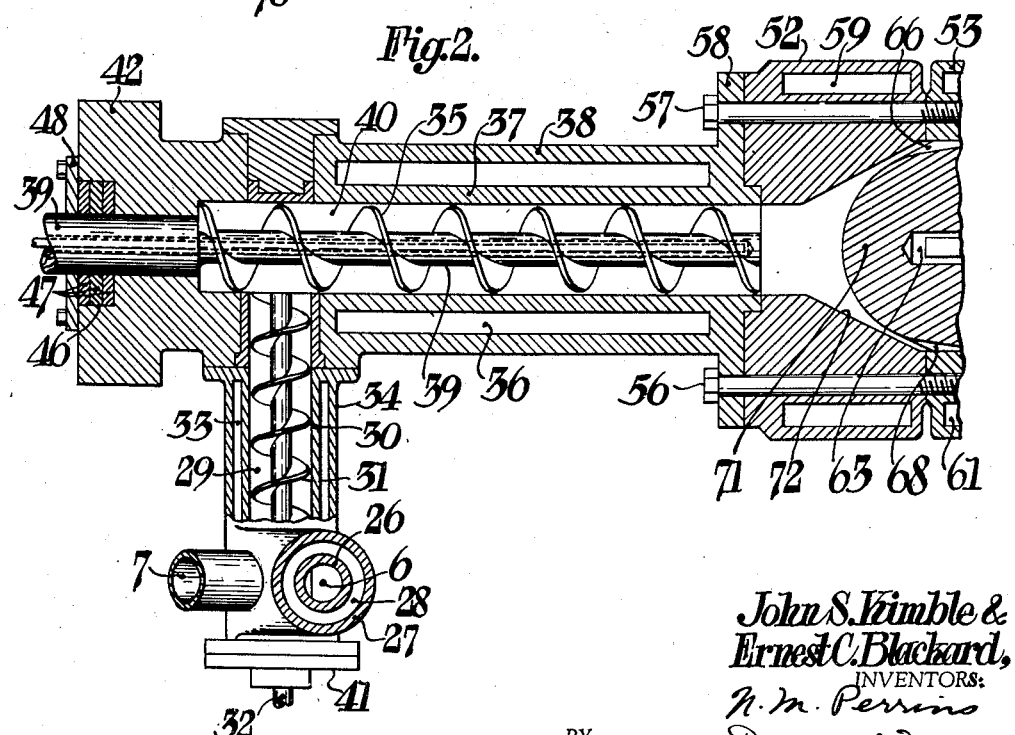
Fig. 2 is an enlarged plan view of a portion of the automatic feeding mechanism shown in Fig. 1 whereby the details of the coaction of the two feed screws may be more clearly understood.

The material is carried along by the conveyor screw 31 through the cooled chamber 29 and into the adjacent heat jacketed chamber 40. This chamber 40 as shown in Figs. 1 and 2, contains a conveyor screw 35 and has a heating jacket 36 formed between the double walls 37 and 38. This conveyor screw 35, if desired, may also be made with a hollow shaft so that a heating medium may be conducted therein to further heat the material in the chamber 40. This chamber is heated sufficiently to cause the composition to become plastic, for example, it may be heated to 145° C. The shaft 39 of screw 35 is journaled in a stuffing box 42 and is rotated by gears 43 and 44, the latter of which is mounted on drive shaft 45 which may be rotated by any suitable source of power applied thereto. The conveying mechanisms are mounted on suitable supports 75 and 76. The construction of the stuffing box 42 is shown in more detail in Fig. 2 and comprises a hollow chamber 46 containing oil wiping rings 47 and closed by a plate 48. The composition is thoroughly heated in chamber 40 as it is carried along by the screw until it becomes a plastic mass. The screw 35 conducts this plastic mass out of chamber 40 and into the extrusion die chamber 55 when it is further heated.

While my improved force feeding apparatus can be employed with any suitable die, I have found that particularly good results are obtained by using it in connection with the die structure and associated apparatus shown in Fig. 1.

As shown in Fig. 1, the extrusion die assembly 51 comprises two hollow members 52 and 53 and a core member 54 positioned in the hollow chamber 55. The members 52 and 53 are fastened together by suitable bolts 56 and 57 and member 52 is in close contact with the conveyor screw chamber being bolted also by the bolts 56 and 57 to the flange 58 of the conveyor screw chamber. Members 52 and 53 have heating jackets 59 and 61 through which suitable heating fluid may be passed, the conducting pipes not being shown.

The core 54 has a hollow center 63 which serves as an internal heating chamber into which a heating fluid may be conducted through inflow pipe 64 and removed by outflow pipe 65. The core 54 is of smaller diameter than the chamber formed by members 52 and 53 so that there is a clearance therebetween. The core 54 is centered on a plurality of supporting arms some of which are shown at 66, 67, 68 and 69 and which are spaced to permit the material to flow between them. Preferably they are of stream line contour so that the plastic mass although divided by them tends to flow together again without having open spaces in the onflowing mass which may interfere with the production of a uniform sheet.

The head 71 of the core 45 is of a blunt shape and the adjacent wall 72 of the chamber is conical so that the plastic material being forced into the chamber is more or less uniformly divided around the core head 71 and a uniform cylinder of plastic material is caused to begin to flow along through the heating chamber 55. This chamber is also heated sufficiently to maintain the plasticity of the composition, for example, approximately 145° C. To further insure a uniform and compact mass after the plastic is divided by the stream lined arms 66, 67, 68, and 69 before the plastic mass is extruded from the die, a hollow circular cavity 73 is formed in the core near the output end. This causes a final commingling of the plastic as it is forced along against the convergence of the die orifice 74.

As shown in Fig. 1, the end of the extrusion die assembly 51 is extended at 77 and a pair of concentric gas jets 78 and 79 are mounted therein above and below the opening of the die. The gas jets may be annular pipes having a plurality of holes appropriately positioned therein so that the outflowing gas will impinge on the extruded tubes. Conduit pipes 83 and 84 connected to a suitable source of gas, not shown, supply gas to the respective jets under pressure. The gas released by these pipes may of course be the same or different gases, and may be at the same or different temperatures, a satisfactory temperature for the gas in both of jets 78 and 79 being 145° C. In general the gas serves to furnish a fluid support and a heating medium for carrying away substances which tend to condense on the apparatus adjacent the die opening. The support and temperature action of the gas on the extruded sheet minimizes the introduction of strains and give a temperature gradient which prevents too sudden cooling of the sheet. Any suitable vapor or gas, such as air, nitrogen, etc. may be employed. This specific gas jet arrangement is the invention of Ernest C. Blackard, one of the applicants herein, and is more fully described and claimed in his copending application Serial No. 127,662 of even date.

While the prevention of condensation of any plasticizer fumes which may occur in the vicinity of the extrusion orifice is extremely important, we do not wish to give the impression that any extensive loss of plasticizer from the sheeting occurs. While water is known to boil at 100° C. it is likewise equally well known that water evaporates slowly at lesser temperatures. Similarly, while the plasticized composition is never heated (in our process) to the boiling point of the plasticizer, none the less, as the sheet leaves the extrusion orifice it is hot enough that a small fraction of the plasticizer fumes away from the sheet. Obviously, after the process is run for several minutes these fumes will condense into droplets, which, as they grow big enough, will drop onto the sheet with consequent damage. By preventing this condensation we prevent consequent damage to the sheeting from droplets falling thereon. The plasticizer is properly termed nonvolatile, because at atmospheric temperatures its volatility is inappreciable.

A slitting mechanism comprising a revolving circular knife 85 is positioned adjacent and above the die orifice 74. An additional annular gas jet 86 is placed in spaced relationship to knife 85 and the pair of concentric jets 78 and 79 are in a plane therewith so that as the slit tube is carried along, the heated gas impinging on its interior will tend to flatten it out without the need of any mechanical device coming in contact therewith. This gas may also further serve to prevent condensation of volatile substances on the sheet.

The extruded sheet 88 after passing the fluid jet 86 is conducted over a pair of conical rolls one of which is shown at 89, over a guide roll 90 and between driven rolls 92 and 93 from which it may be further treated as desired. Preferably the driven rolls 92 and 93 are rotated at a rate which is substantially equal to the rate at which the sheet is extruded and consequently exert substantially no tension on the sheet.

The operation of our improved sheeting device may be described somewhat as follows:

A suitable plasticized cellulose organic derivative molding composition in granular form, such as that described in the above Blackard and Waterman application of even date, is introduced in periodic equal weighed batches through the hopper into the chamber 6. This is done by means of an automatic weighing device common in the art. The movement of the plunger 17 is so synchronized as to reciprocate immediately following the introduction of each weighted batch of material into the chamber 6. Thus as each batch is periodically introduced into the chamber 6 the plunger 17 is driven forward, forcing the plasticized composition into the chamber 29 wherein it is carried along by the revolving feed screw conveyor 31. While being carried through the greater part of the chamber 29, the composition is cooled by the jackets therefor. This conveyor 31 discharges the composition into the chamber 40 wherein the material is not only carried along by the power screw conveyor 35 but is caused to travel around the core 54 and out through the annular orifice 74. Due to the jacketing of the chamber 40 and the chamber housing the core 54 and the internal heating of the power screw 35 and the core 54, the composition being conveyed therethrough is heated to a suitable temperature so that, when taken with the kneading action provided by the power screw 35, the composition is thoroughly mixed and colloidized so that when the composition issues in the form of a tube which is then slit into a sheet, a sheet is provided which is entirely homogeneous and colloidized.

In a machine of the kind illustrated we have found that a pressure of from approximately 600 to 700 pounds per square inch and preferably about 670 pounds per square inch upon the plunger 17 is suitable. This of course depends somewhat upon the characteristics of the entire machine and the composition being extruded. Obviously there must be enough pressure to force the material into the chamber 29 so that the feed screw 31 picks up the material and moves it along. In fact this is one of the unusual features of our device. It might be supposed that the plasticized composition could merely be allowed to run by gravity into the chamber 29 wherein the feed screw 31 would pick the material up and force it along. However, we have found that such mere gravity feed is liable to result in a sheet which contains irregularities of various kinds due to the fact that the plasticized composition is not fed to the extrusion orifice positively enough. By employing the intermittent positive pressure of the plunger 17 upon the composition fed, we have been able to obtain a very uniform feed pressure at the extrusion orifice.

The temperature of the heating fluid supplied to the jackets and to the interior of the power screw 35 and the core 54 may range between 100° and 170° C. When dealing with a plasticized cellulose acetate composition a heating temperature of approximately 145° C. is to be preferred. Likewise by heating the air introduced to the jets 78, 79 and 86, with the heating fluid as it leaves the jackets, the air as introduced to these jets is maintained at about the same temperature, namely, 100–170° C., preferably about 145° C.

By employing this improved method of feeding thermoplastic materials to an extrusion die it is possible to produce a sheet of uniform density since the cooperation of the injection press and the conveyor screws assure that a closely packed material having a uniform density is forced through the die chamber. Furthermore the extrusion of a sheet of uniform density enhances the production of a sheet having uniform dimensions.

What is claimed is:

The method of extruding a continuous attenuated article of uniform density and dimensions from an extrusion die which comprises regularly injecting predetermined uniform amounts of a suitable volatile solvent-free cellulose derivative composition from a pressure cylinder into a screw conveyor at least a portion of the input end of the conveyor being cooled, conveying the composition from the cooled conveyor to a heated screw conveyor wherein the composition becomes plastic, and forcing the plastic composition through a suitable die attached to the heated conveyor.

JOHN S. KIMBLE.
ERNEST C. BLACKARD.